(12) United States Patent
Pearl, II et al.

(10) Patent No.: US 9,328,870 B2
(45) Date of Patent: May 3, 2016

(54) FLOW REGULATOR FOR NITROGEN PURGING, SYSTEM AND METHOD

(71) Applicant: Uniweld Products, Inc., Fort Lauderdale, FL (US)

(72) Inventors: David S. Pearl, II, Fort Lauderdale, FL (US); Dragan Bukur, Fort Lauderdale, FL (US); David Foster, Plantation, FL (US); Douglas B. Pearl, Hollywood, FL (US)

(73) Assignee: Uniweld Products, Inc., Fort Lauderdale, FL (US)

( * ) Notice: Subject to any disclaimer, the term of this patent is extended or adjusted under 35 U.S.C. 154(b) by 171 days.

(21) Appl. No.: 14/156,910

(22) Filed: Jan. 16, 2014

(65) Prior Publication Data

US 2015/0198287 A1    Jul. 16, 2015

(51) Int. Cl.
*F17C 13/04*        (2006.01)
*F16K 37/00*        (2006.01)
*G01F 1/22*         (2006.01)

(52) U.S. Cl.
CPC .............. *F17C 13/04* (2013.01); *F16K 37/0058* (2013.01); *F17C 2205/0332* (2013.01); *F17C 2205/0394* (2013.01); *F17C 2250/0636* (2013.01); *G01F 1/22* (2013.01); *Y10T 137/0318* (2015.04); *Y10T 137/8158* (2015.04); *Y10T 137/8326* (2015.04)

(58) Field of Classification Search
CPC ............. F17C 13/04; F17C 2250/0636; F17C 2205/0332; F17C 2205/0394; F16K 17/00; F16K 37/0058; Y10T 137/8158; Y10T 137/8326; Y10T 137/8359; G01F 1/22; G01F 1/28
See application file for complete search history.

(56) References Cited

U.S. PATENT DOCUMENTS

| | | | | |
|---|---|---|---|---|
| 1,483,200 A | * | 2/1924 | Skold | G01F 1/22 116/276 |
| 2,639,908 A | | 5/1953 | Graham | |
| 2,655,041 A | * | 10/1953 | Jacobsson | G01F 1/22 137/544 |
| 2,778,223 A | * | 1/1957 | Kimbrell | G01F 1/22 137/557 |
| 2,908,158 A | * | 10/1959 | Jacobsson | G01M 3/2876 137/505.11 |
| 3,474,816 A | * | 10/1969 | Burgess | G05D 16/0641 137/107 |
| 3,524,465 A | | 8/1970 | Sadler | |
| 3,586,045 A | * | 6/1971 | Zimmer | A61M 16/10 137/505.18 |

(Continued)

OTHER PUBLICATIONS

"Why Purge with Nitrogen" by Victor Technologies (Non-patent literature published on the internet on Dec. 2012) http://www.victortechnologies.com/TurboTorch/Featured_Products_Page/product-features.php.*

(Continued)

*Primary Examiner* — Kevin Murphy
*Assistant Examiner* — David Colon Morales
(74) *Attorney, Agent, or Firm* — Nields, Lemack & Frame, LLC

(57) ABSTRACT

Flow regulator, system and method that allow regulation of gas flow, both during a purging operation such as to purge a line of oxygen, and during a brazing operation to maintain the line free or substantially free of oxygen during the brazing operation. The system includes a gas source, such as a nitrogen tank containing a source of nitrogen, a gas regulator in fluid communication with the gas source to regulate the delivery pressure from the gas source, and a flow regulator in fluid communication with the gas source to regulate the flow of gas during the purge and brazing operations. The flow regulator provides a visual indication that gas is flowing, and a visual indication of the particular flow rate of the flowing gas.

15 Claims, 6 Drawing Sheets

(56) References Cited

U.S. PATENT DOCUMENTS

| | | | | |
|---|---|---|---|---|
| 3,633,421 A | * | 1/1972 | Phillips | G01F 1/22 137/558 |
| 3,691,834 A | * | 9/1972 | De Fasselle | G01F 1/22 73/861.54 |
| 3,751,971 A | * | 8/1973 | Wilcox | G01F 1/22 73/37.9 |
| 4,174,733 A | * | 11/1979 | Eidsmore | G01F 15/00 137/269 |
| 4,317,376 A | * | 3/1982 | Fitzpatrick | G01F 1/22 403/316 |
| 4,562,863 A | * | 1/1986 | Claussen | A01C 7/102 137/557 |
| 4,768,543 A | * | 9/1988 | Wienke | F16K 1/305 137/240 |
| 4,957,133 A | | 9/1990 | Linz et al. | |
| 5,398,721 A | * | 3/1995 | Pryor | G01F 1/22 137/505.25 |
| 5,507,190 A | * | 4/1996 | Guttmann | G01F 1/22 73/861.57 |
| 5,549,277 A | * | 8/1996 | Franz | G01F 1/22 251/223 |
| 6,036,054 A | | 3/2000 | Grill | |
| 6,155,066 A | | 12/2000 | Chandler et al. | |
| 6,196,016 B1 | | 3/2001 | Knowles et al. | |
| 6,212,957 B1 | * | 4/2001 | McCombs | G01F 1/22 73/1.33 |
| 6,484,750 B1 | * | 11/2002 | Foos | G01F 1/22 137/505.25 |
| 6,708,717 B1 | | 3/2004 | Coogle | |
| 8,181,665 B2 | | 5/2012 | Pearl, II et al. | |
| 2006/0179852 A1 | | 8/2006 | Thomas et al. | |

OTHER PUBLICATIONS

"Nitrogen purge flow meter for brazing hvac pipes" by Youtube user "heavydiesel" (Non-patent literature published on the internet on May 2011) https://www.youtube.com/watch?v=TlkhTHXS7NY.*

"Nitrogen Flushing of Air Conditioning and Refrigeration Systems" by "Engineer" (Non-patent literature published on the internet on Nov. 2013) http://www.methodstatementhq.com/nitrogen-flushing-of-air-conditioning-and-refrigeration-systems.html.*

"Brazing to make an R-410A System Leak-free" by Robert Henson (Non-patent literature published on Oct. 2009 in the rsesjournal.com).*

DiversiTech Corp.: Flushing Solvent Kit, with Tech Data Sheet, Posted Mar. 2, 2009, 2 pages.

Atlantic Chemical & Equipment Co., Inc., Ace Power Flush Kit data sheet, 2007, 1 page.

Uniweld Products, Inc., UNF3 Nitrogen Flow Indicator, 1 page, http://uniweld.com/news-releases/59-unf3-nitrogen-flow-indicator, retrieved from the internet Apr. 28, 2014.

* cited by examiner

FLOW REGULATOR FOR NITROGEN PURGING, SYSTEM AND METHOD

BACKGROUND

In the HVAC industry, purging refrigeration lines with nitrogen to eliminate oxygen prior to and during a brazing operation during installation or maintenance reduces or eliminates the formation of deleterious oxides. For example, when brazing copper, the combination of the heat applied and oxygen in the ambient air creates a chemical reaction that forms copper oxide. The oxide can form flakes that can become lodged in the thermal expansion valve of the HVAC system and cause system failure, or can foul system filters. Flowing nitrogen during brazing eliminates the oxygen and thus the formation of the oxides.

In such a purging and brazing operation, it is important to have the correct amount of nitrogen flow in the system while avoiding the formation of these deleterious oxides. If too much nitrogen flows during brazing, pin holes can be created and a poor quality braze can result. If insufficient nitrogen flows during brazing, deleterious oxides can be formed.

Embodiments disclosed herein enable proper purging of a refrigerant system with nitrogen gas and ensure that the correct amount of nitrogen flows in the line during the brazing operation.

SUMMARY

Problems of the prior art have been overcome by the embodiments disclosed herein, which include a flow regulator, system and method that allow regulation of gas flow, both during a purging operation such as to purge a line of oxygen, and during a brazing operation to maintain the line free or substantially free of oxygen during the brazing operation. In certain embodiments, the system includes a gas source, such as a nitrogen tank containing a source of nitrogen, a gas regulator in fluid communication with the gas source to regulate the delivery pressure from the gas source, and a flow regulator in fluid communication with the gas source to regulate the flow of gas during the purge and brazing operations. In certain embodiments, the flow regulator provides a visual indication that gas is flowing, and a visual indication of the particular flow rate of the flowing gas.

In its method aspects, embodiments include A method of monitoring the flow of gas in a brazing operation by providing a gas source and a gas flow regulator in communication with the gas source, the gas flow regulator comprising a valve body having a gas inlet and a gas outlet spaced from the gas inlet, a regulator body in fluid communication with the valve body, the regulator body having a sight housing visible through at least one window in the regulator body, and a floating member in the sight housing. In certain embodiments, the method includes flowing gas from the gas source to the gas flow regulator, the flowing gas causing the floating member in the sight housing to float in the housing, the position of the floating member in the sight housing corresponding to a gas flow rate. Based upon the indicated gas flow rate, the flow rate of the gas can be increased or decreased (or can remain the same) accordingly.

DETAILED DESCRIPTION

Figure 1:
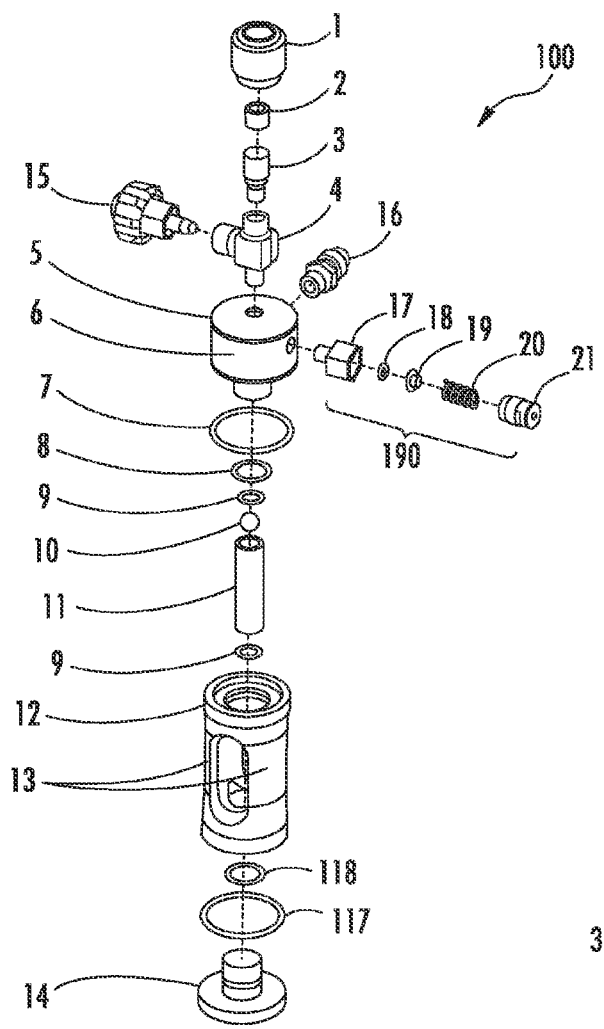
FIG. 1 is an exploded view of a flow regulator in accordance with certain embodiments.

Turning first to FIG. 1, there is shown a flow regulator 100 in accordance with certain embodiments. In certain embodiments, the flow regulator 100 includes a connector nut 1, a neoprene sleeve 2, and an inlet nipple 3 connected to a valve body 4. The neoprene sleeve 2 and the inlet nipple 3 fit into the connector nut 1. The valve body 4 is affixed to body member 12 using O-rings 7 and 8, which body member 12 houses sight housing 11 such as a tube, the sight housing 11 containing float ball 10. Bottom cap 14 is sealed to the body member 12 using O-rings 117 and 118.

Figure 8:
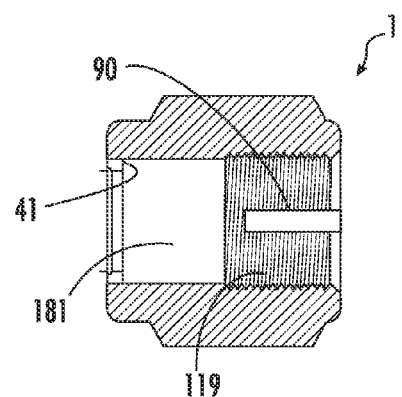
FIG. 8 is a cross-sectional view of a connector nut of the flow regulator of FIG. 1 in accordance with certain embodiments.

As best seen in FIG. 8, the connector nut 1 mates to one end of inlet nipple 3. Preferably a neoprene sleeve 2 or the like is interposed between the nipple 3 and the connector nut 1 and serves as a gasket to help effectuate a seal. The opposite end of inlet nipple 3 is threadingly coupled to the inlet 70 of the valve body 4. The connector nut 1, as seen in FIG. 8, includes an internal cavity 181 that is configured to receive in a lower portion thereof the inlet nipple 3. The upper portion of the internal cavity 181 is internally threaded with threads 119 to mate with a member in fluid communication with a gas source. In certain embodiments, the connector nut 1 includes one or more (preferably two, spaced 180° apart) axially extending vent slots 90. The vent slots 90 allow vapor to vent in the direction of the gas source upon disconnection of the device.

Figure 3:
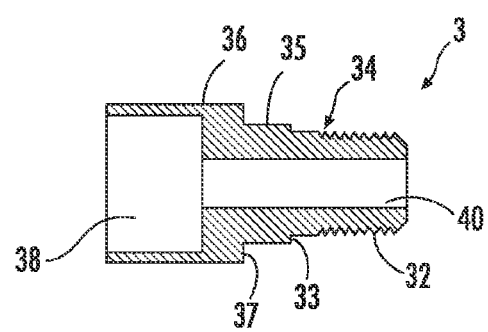
FIG. 3 is a cross-sectional view of an inlet nipple of the flow regulator of FIG. 1 in accordance with certain embodiments.

FIG. 3 shows an embodiment of inlet nipple 3, one end of which has external threads 32 for mating with internal threads in inlet 70 of the valve body 4. In certain embodiments, the inlet nipple 3 is stepped, and includes a first elongated portion 34 having a first diameter, a second portion 35 defined at annular shoulder 33 having a second diameter larger than said first diameter, and a third portion 36 defined at annular shoulder 37 having a third diameter larger than the second diameter. The third portion 36 includes a cavity 38 that may include a neoprene sleeve. Third portion 36 is configured to fit into connector nut 1, with shoulder 37 seating against a corresponding shoulder 41 in the connector nut 1. An axial bore 40 communicates with cavity 38 and axial bore 71 in the inlet 70 of the valve body 4 and extends through the inlet nipple 3 as shown.

Figure 7:
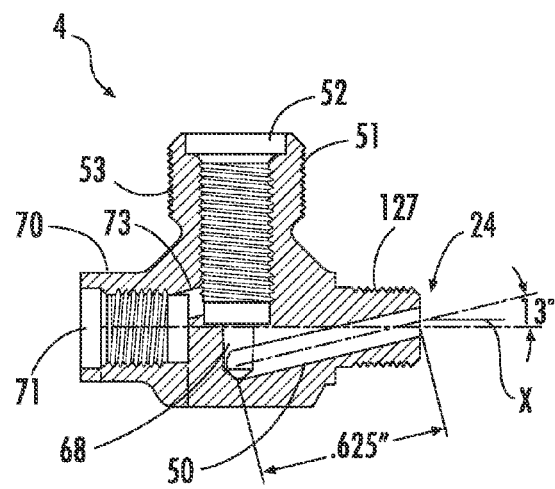
FIG. 7 is a cross-sectional view of a valve body of the flow regulator of FIG. 1 in accordance with certain embodiments.

As shown in the embodiment of FIG. 7, the valve body 4 includes outlet 24 having external threads 127. In certain embodiments, the outlet 24 includes a bore 50 that is formed at a 13° angle with respect to the longitudinal centerline X. In the embodiment shown, the bore 50 extends into the valve body at distance of 0.625 inches, where it is in fluid communication with bore 52 in gas flow regulator inlet 51.

Figure 9:
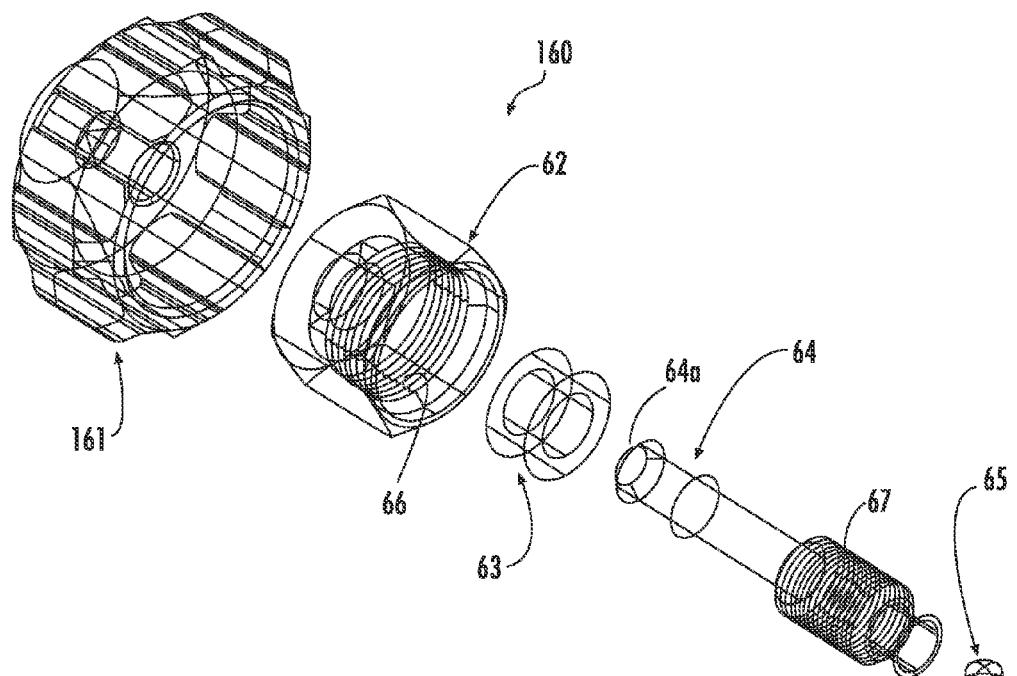
FIG. 9 is an exploded view of a valve stem assembly in accordance with certain embodiments.

In certain embodiments, the gas flow regulator inlet of valve body 4 has external threads 53, and includes internally threaded bore 52. The gas flow regulator inlet receives valve stem assembly 160, shown in detail in FIG. 9. In certain embodiments, the valve stem assembly 160 includes valve wheel 161, packing nut 62, packing washer 63, valve stem 64, and ball 65. One end 64a of the valve stem 64 is affixed to the valve wheel 161, such as by press fitting. A portion of the valve stem 64 includes external threads 67, which mate with the internal threads of the gas flow regulator inlet 51. Packing nut 62 and packing washer 63 fit over the valve stem 64. The packing nut 62 includes internal threads 66, which mate with the external threads on the gas flow regulator inlet 51 and secure the valve stem assembly to that inlet. The end 64b of valve stem includes stainless steel ball member 65, which protrudes out of the valve stem a fixed distance. Actuation of the valve wheel 161, such as by rotation, causes rotation of the valve stem 64 and thus axial displacement of the valve stem within the bore 52 of the gas flow regulator inlet 51. As the valve stem 64 is actuated axially deeper into the bore of the gas flow regulator inlet 51, it proceeds deeper into the narrow bore 68 (FIG. 7), eventually completely cutting off fluid communication between the bore 73 and the bore 68, stopping gas flow.

Referring back to FIG. 7, in certain embodiments the valve body 4 includes inlet 70. The inlet 70 includes an internally threaded bore 71 that is in fluid communication with the bore 52 of the gas flow regulator inlet 51 via internal angled bore 73.

Figure 5:
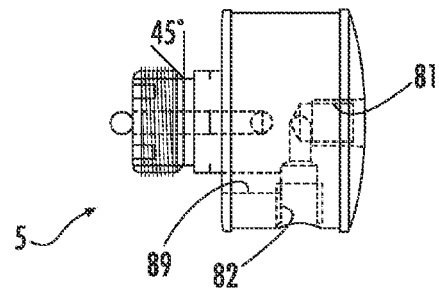
FIG. 5 is a first cross-sectional view of a top cap of the flow regulator of FIG. 1 in accordance with certain embodiments.

The valve body 4 is affixed to top cap 5, best seen in FIG. 5. In certain embodiments, the outlet 24 of the valve body 4 is in fluid communication with the axial bore 81 of the top cap 5. Axial bore 81 communicates with stepped radial bore 82. In certain embodiments, stepped radial bore 82 has its largest diameter at the most radially outwardly portion of the bore, with a narrower diameter in the intermediate portion of the bore, and the narrowest diameter at the radially inwardly most portion of the bore, the latter intersecting with the axial bore 81. This stepped radial bore 82 receives pressure relief assembly 190.

Figure 6:
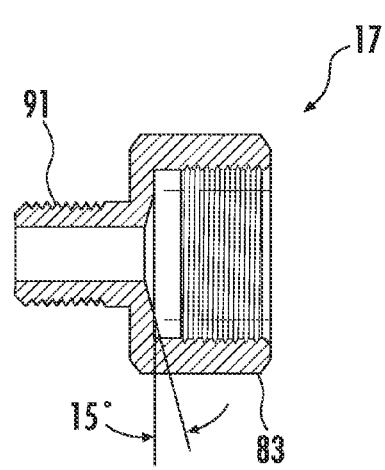
FIG. 6 is a cross-sectional view of a connector of the flow regulator of FIG. 1 in accordance with certain embodiments.
Figure 10:
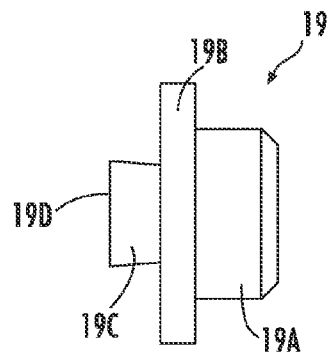
FIG. 10 is a cross-sectional view of a seat holder of the flow regulator of FIG. 1 in accordance with certain embodiments.
Figure 11:
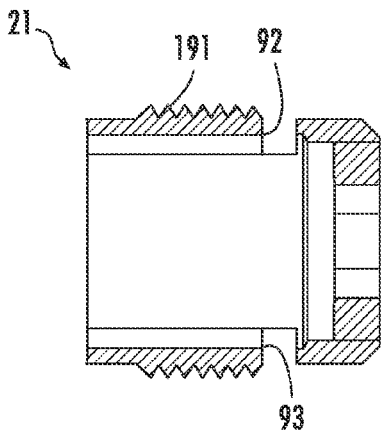
FIG. 11 is a cross-sectional view of a safety valve relief cap of the flow regulator of FIG. 1 in accordance with certain embodiments.

In certain embodiments, the reseatable pressure relief assembly 190 includes connector 17 (FIG. 6), O-ring 18, seat holder 19 (FIG. 10), biasing member 20, and safety valve relief cap 21 (FIG. 11). Connector 17 includes an externally threaded stem 91 that mates with internally threaded bore 82 of the top cap 5. The stem 91 extends from connector body portion 83 that is internally threaded to receive external threads 191 of safety valve relief cap 21. The safety valve relief cap 21 holds in place O-ring 18, seat holder 19 and biasing member 20. The biasing member 20 sits on seat holder 19. In certain embodiments, as best seen in FIG. 11, the safety valve relief cap 21 includes axial slots 92, 93 which communicate with the interior cavity of the safety valve relief cap 21. Preferably two diametrically opposed axial slots 92, 93 are present and are positioned so that when relief cap 21 is coupled to the cap 5, at least a portion of a slot 92, 93 is open to ambient. The slot or slots 92, 93 extend radially inwardly, and allow fluid communication between radial bore 82 and the ambient. An axial bore 95 is offset from the longitudinal centerline of the top cap 5, and communicates with the stepped radial bore 82 as shown in FIG. 5. This allows for escape of gas to ambient through the axial slots 92, 93 in the event of an over pressurization. The biasing member 20, which in certain embodiments is a compression spring, is positioned during operation in the generally hollow interior of the relief cap 21. The biasing member 20 seats on seat holder 19. The seat holder 19 includes a generally cylindrical portion 19A, preferably chamfered at its top, which has an outer diameter slightly smaller than an inner diameter of the biasing member 20. An annular flange 19B extends radially outwardly from the base of the portion 19A, and preferably has a diameter substantially the same as the outer diameter of the biasing member 20. Accordingly, the biasing member is supported on the flange 19B, with the portion 19A extending into the interior of the biasing member 20 when in the assembled condition. Extending axially from the flange 19B is a tapered portion 19C. Portion 19C tapers radially outwardly towards its free end 19D a distance sufficient to carry O-ring 18.

If the pressure is sufficient to overcome the force of the biasing member 20, that pressure forces the seat holder 19 radially outwardly, thereby opening the pressure relief valve and allowing fluid flow out the one or more slots 92, 93 to ambient. As a result, the device is protected from over-pressurization. Those skilled in the art will appreciate that the biasing member 20 is thus selected to have a spring constant such that over-pressurization is prevented. A suitable spring constant is one where a pressure of about 200-210 psi is sufficient to overcome the bias of the biasing member 20.

Turning back to FIG. 5, top cap includes axial bore 89 that is offset from the longitudinal centerline of the top cap 5, and communicates with radial bore 82, which in turn is in communication with radial bore 81. When the top cap is properly position on body member 12, the axial bore 89 aligns with an axial bore 99 in the body member 12, as discussed in greater detail below.

Figure 2:
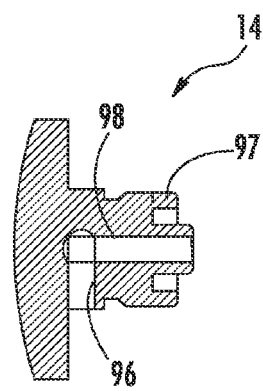
FIG. 2 is a cross-sectional view of a bottom cap of the flow regulator of FIG. 1 in accordance with certain embodiments.
Figure 4:
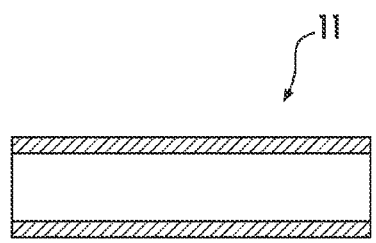
FIG. 4 is a cross-sectional view of a sight tube of the flow regulator of FIG. 1 in accordance with certain embodiments.
Figure 5A:
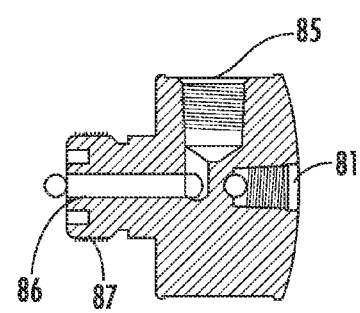
FIG. 5A is a second cross-sectional view of a top cap of the flow regulator of FIG. 1 in accordance with certain embodiments.
Figure 12:
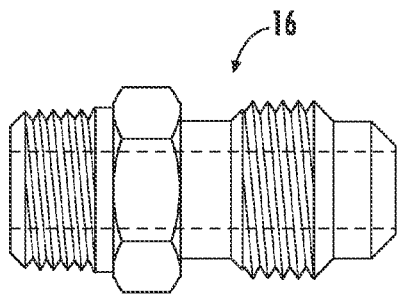
FIG. 12 is a cross-sectional view of a hose connector of the flow regulator of FIG. 1 in accordance with certain embodiments.
Figure 14:
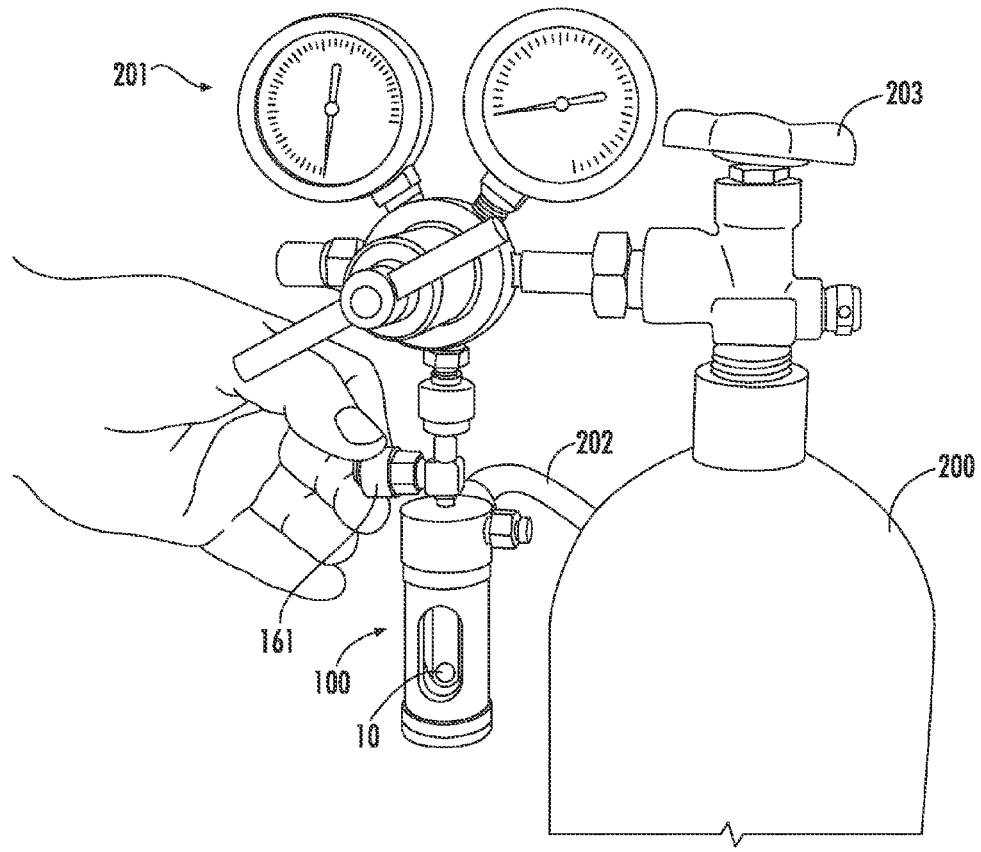
FIG. 14 is a schematic view of a system including a nitrogen source, a gas regulator, and a flow regulator in accordance with certain embodiments.

In certain embodiments, a second radial bore 85, spaced 90 degrees from the stepped radial bore 82, is provided in the top cap 5, as seen in FIG. 5A. The second radial bore 85 is internally threaded, and receives externally threaded hose connector 16 shown in FIG. 12, which in operation is an outlet and connects to the access fitting of a refrigeration system via a hose 202 or the like (FIG. 14). The second radial bore 85 is in fluid communication with hollow tube 86, which extends axially through the externally threaded outlet 87 and protrudes slightly therefrom. The protruding end of the tube 86 is notched, and has an outside diameter sufficient to receive one end of the sight housing 11 (FIG. 4). The annular gap between the tube 86 and the outlet 87 is fitted with a sealing ring (not shown) against which the sight housing abuts. In certain embodiments, sight housing 11 is an elongated hollow tube, which can be made of plastic, which holds float ball 10. The bottom of sight housing 11 mates with externally threaded notched stem 97 on bottom cap 14 (FIG. 2).

Figure 13A:
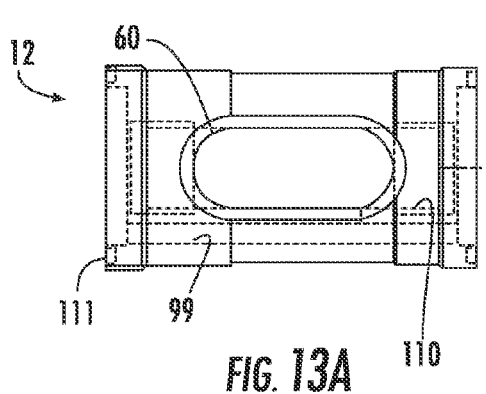
FIG. 13A is a front view of a connector of the flow regulator of FIG. 1 in accordance with certain embodiments.
Figure 13B:
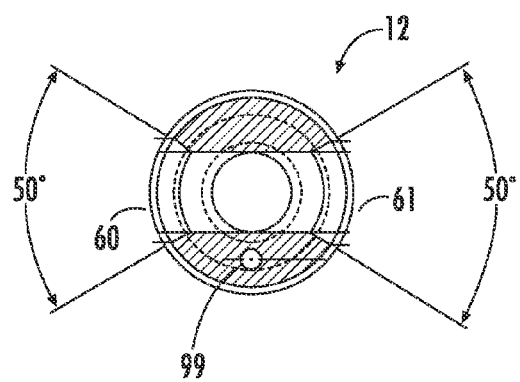
FIG. 13B is a top view of the connector of FIG. 13A.

In certain embodiments, the body member 12 (FIGS. 13A, 13B) includes one or more (two shown) elongated windows 60, 61 that provide visual access to the float ball 10 in sight housing 11. Through the thus formed window or windows, the status of the flow of gas can be visually monitored. Indicia can be provided on the body member 12 that indicates the actual flow rate of gas based on the vertical height of the float ball 10. In certain embodiments, the body member 12 also includes axial bore 99 offset from the longitudinal centerline of the body member 12. The axial bore 99 extends through the length of the body member 12, and when the body member 12 is coupled to the top cap 5 (such as via externally threaded outlet 87 that mates with internally threaded bore 110 in the body member 12), the axial bore 99 aligns with axial bore 89 of the top cap 5 and is in fluid communication therewith. In the assembled condition, the axial bore 99 is also in fluid communication with radial bore 96 of bottom cap 14 (FIG. 2), which in turn communicates with axial bore 98 as shown. The base 111 of the body member 12 can include an annular recess 113 for receiving an O-ring or the like to seal to the bottom cap 14.

In operation, the gas flow regulator 100 is placed in gas-receiving communication with a gas source 200 (FIG. 13), such as a nitrogen cylinder. In certain embodiments, the gas flow regulator is placed in fluid communication with the outlet of a standard gas regulator 201 that is in fluid communication with the gas source 200. The gas cylinder valve 203 is opened, and the delivery pressure is set to the desired pressure for purging the lines of oxygen (e.g., 60 psi), using the gas regulator 201. The gas flow regulator 100 is then adjusted to fine tune the gas flow rate, such as to 20+ (plus) standard cubic feet per hour (SCFH), using the valve stem assembly 15, and in particular, by rotating the wheel 161.

Figure 15:
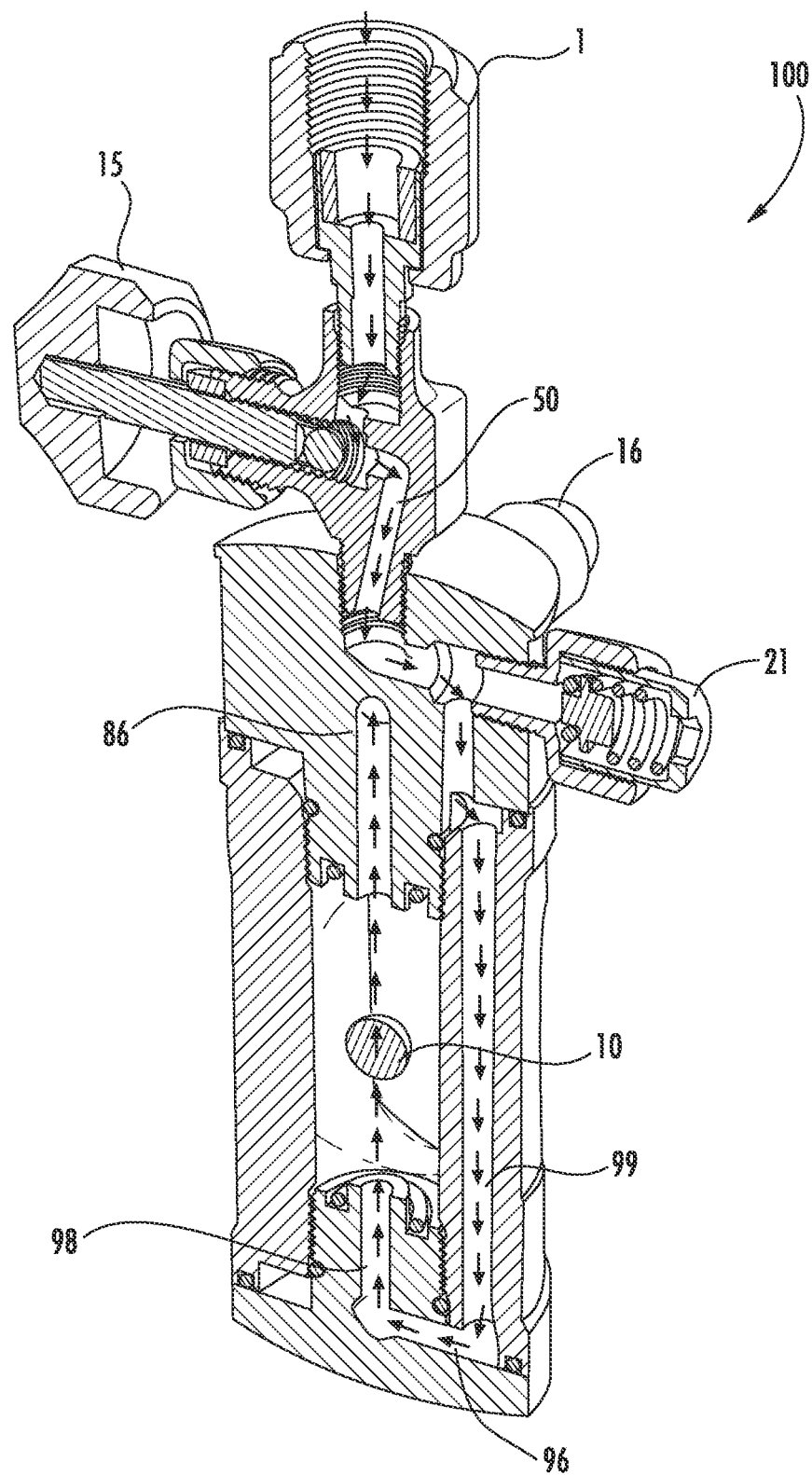
FIG. 15 is a cross-sectional view, in perspective, showing the gas flow through the gas flow regulator in accordance with certain embodiments.

Gas flows from the gas source 200, through the regulator 201, and into the inlet connector nut 1 of the gas flow regulator 100. As seen by arrows in FIG. 15, from there it travels through valve body 4, into axial bore 81 of the top cap 5, through radial bore 82, into axial bore 89, axial bore 99 of the body member 12, radial bore 96 of the bottom cap 14, axial bore 98 of the bottom cap 14, and then into the sight housing 11. The flow of gas in the sight housing 11 floats the ball 10. The height of the float ball 10 indicates to the operator the actual gas flow rate both in the regulator and to the line in communication with the outlet of the regulator, to facilitate the gas flow adjustment and to monitor the gas flow. The gas flows out of the sight housing 11, back into top cap 5 via tube 86, and out the device via radial bore 85.

Once the lines have been purged, the gas pressure can be set to the desired pressure for brazing, such as 20 psi. To that end, the conventional regulator is adjusted to about 20 psi, and then the flow rate is fine tuned by adjusting the gas flow regulator 100, again using valve wheel 161 of the valve stem assembly 15, to a flow rate of 3 to 5 SCFH, for example. During brazing, the height of the float ball 10 can be monitored visually through the connector windows to ensure that the proper gas flow rate is maintained during the brazing operation. In certain embodiments, the body 12 can include visual indicia, such as markings on a label appropriately affixed to the body 12, which correlate the height of the float ball 10 to the flow rate of gas.

The result is a simplified process of purging a refrigeration system with gas, such as nitrogen, and during the brazing of copper tubing, providing a protective internal cover gas.

What is claimed is:

1. A gas flow regulator, comprising a valve body having a gas inlet and a gas outlet spaced from said gas inlet, a regulator body in fluid communication with said valve body, said regulator body having a sight housing visible through at least one window in said regulator body, a top cap coupled to said regulator body, said top cap being in fluid communication with said gas outlet of said valve body, and a bottom cap coupled to said regulator body, wherein said gas flow regulator has a gas flow pathway from said gas inlet, through said valve body, said top cap, said regulator body, said bottom cap, and into said sight housing, and a floating member in said sight housing, wherein the gas flow into said sight housing floats said floating member to a height indicative of the gas flow rate in said regulator.

2. The gas flow regulator of claim 1, further comprising a pressure relief device.

3. The gas flow regulator of claim 2, wherein said pressure relief device is reseatable.

4. The gas flow regulator of claim 1, wherein said valve body further comprises a gas flow regulator inlet having a bore, and a valve stem in said bore adapted to be axially displaceable in said bore to a position blocking gas flow from said gas inlet to said gas outlet.

5. The gas flow regulator of claim 1, wherein said gas inlet of said valve body has an axial centerline, and a bore formed at a 13° angle with respect to said axial centerline.

6. The gas flow regulator of claim 1, wherein said top cap further comprises a pressure relief assembly.

7. A system for purging a line of oxygen, comprising a nitrogen source, a gas regulator in fluid communication with said nitrogen source, and a gas flow regulator in fluid communication with said nitrogen source, said gas flow regulator comprising a valve body comprising a gas inlet and a gas outlet spaced from said gas inlet, a regulator body in fluid communication with said valve body, said regulator body having a sight housing visible through at least one window in said regulator body, and a floating member in said sight housing, a top cap coupled to said regulator body, said top cap being in fluid communication with said gas outlet of said valve body, and a bottom cap coupled to said regulator body, wherein said gas flow regulator has a gas flow pathway from said gas inlet, through said valve body, said top cap, said regulator body, said bottom cap, and into said sight housing, wherein the gas flow into said sight housing floats said floating member to a height indicative of the gas flow rate in said regulator.

8. The system of claim 7, further comprising a pressure relief device.

9. The system of claim 8, wherein said pressure relief device is reseatable.

10. The system of claim 7, wherein said valve body further comprises a gas flow regulator inlet having a bore, and a valve stem in said bore adapted to be axially displaceable in said bore to a position blocking gas flow from said gas inlet to said gas outlet.

11. The system of claim 7, wherein said gas inlet of said valve body has an axial centerline, and a bore formed at a 13° angle with respect to said axial centerline.

12. The system of claim 7, wherein said top cap further comprises a pressure relief assembly.

13. A method of monitoring the flow of gas in a brazing operation, comprising:
providing a gas source;
providing a gas flow regulator in communication with said gas source, said gas flow regulator comprising a valve body having a gas inlet and a gas outlet spaced from said gas inlet, a regulator body in fluid communication with said valve body, said regulator body having a sight housing visible through at least one window in said regulator body, a top cap coupled to said regulator body, said top cap being in fluid communication with said gas outlet of said valve body, and a bottom cap coupled to said regulator body, wherein said gas flow regulator has a gas flow pathway from said gas inlet, through said valve body, said top cap, said regulator body, said bottom cap, and into said sight housing, and a floating member in said sight housing;

flowing gas from said gas source to said gas flow regulator, said flowing gas causing said floating member in said sight housing to float in said housing, a position of said floating member in said sight housing indicating a corresponding gas flow rate; and increasing or decreasing the flow rate of said gas based upon the height of said floating member.

14. The method of claim 13, wherein said valve body further comprises a gas flow regulator inlet having a bore, and wherein said increasing or decreasing the flow rate of said gas based upon the height of said floating member is carried out by actuating a valve stem in said bore to cause said valve stem to displace axially in said bore.

15. The method of claim 13, further comprising relieving the pressure in said gas flow regulator when said pressure exceeds a predetermined value.

* * * * *